July 9, 1940.  W. H. NOELTING  2,207,549
EXPANSIBLE SOCKET FOR CASTERS
Filed Dec. 7, 1938
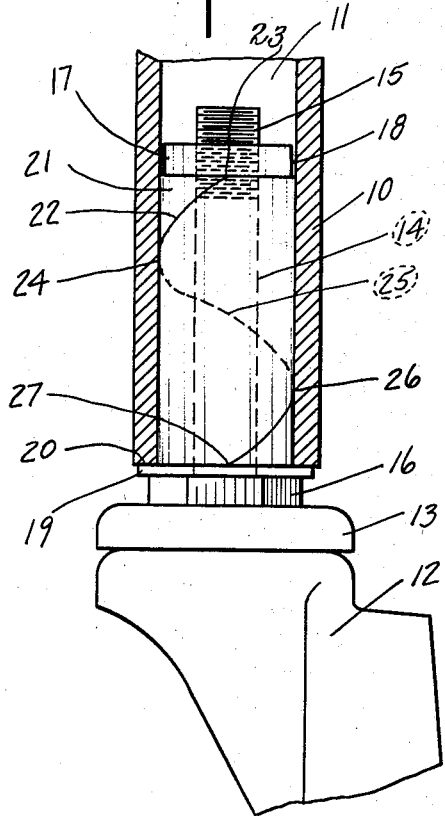
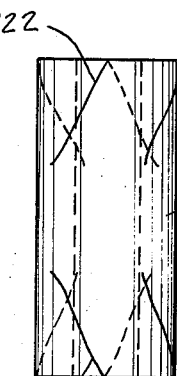
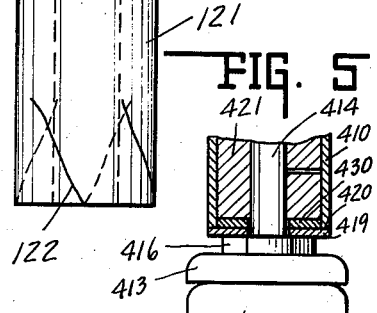
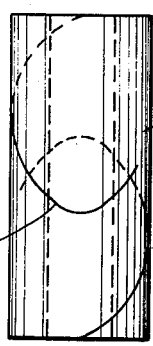
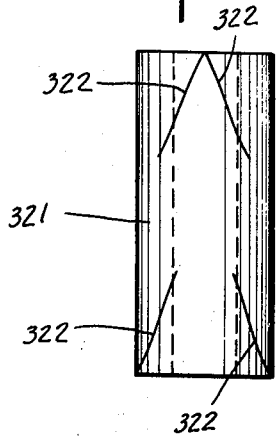
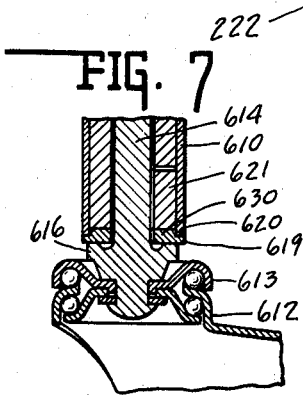
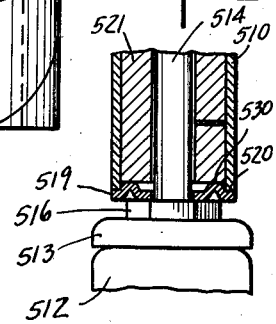
INVENTOR.
WILLIAM H. NOELTING.
BY Lockwood, Goldsmith & Galt
ATTORNEYS.

Patented July 9, 1940

2,207,549

UNITED STATES PATENT OFFICE 2,207,549

EXPANSIBLE SOCKET FOR CASTERS

William H. Noelting, Evansville, Ind., assignor to Faultless Caster Corporation, Evansville, Ind., a corporation Application December 7, 1938, Serial No. 244,321

5 Claims. (Cl. 16—38)

This invention relates to rubber or rubber-like sleeve expanders for anchoring a caster structure to a tubular leg, the expander being receivable by the leg tubularity and being expanded by relative rotation between two members which clamp the rubber-like sleeve therebetween.

The chief object of the invention is to provide a construction of the aforesaid type which may be quickly expanded for initial contact with the tubular leg inner wall and which thereafter is mechanically expanded until all mechanical expansion possible is completed and which thereafter can be compressed to insure complete expansion for full peripheral contact and thereby provide for the necessary holding pressure.

The chief feature of the invention consists in employing a rubber or rubber-like sleeve means which has incorporated therein one or more annularly directed slits and which may extend from one end to the other end of the sleeve construction or which may extend from either or both ends of the sleeve construction and terminate intermediate the ends thereof. When a plurality of slits are employed, the same do not extend from end to end of the sleeve means. Also when a plurality of slits are employed, the same may be annularly offset and in parallel arrangement or the slits may be divergingly directed, all as hereinafter pointed out.

Other objects and features of the invention will appear more fully hereinafter.

The full nature of the invention will be understood from the accompanying drawing and the following description and claims:

In the drawing,

Fig. 1 is a sectional view through the lower end of a tubular leg in which is mounted a caster embodying one form of the invention, a portion of the yoke of the caster being broken away and the wheel portion being omitted, the caster structure including the sleeve embodiment being shown in elevation.

Fig. 2 is a side elevational view of a sleeve constituting another embodiment of the invention.

Fig. 3 is a similar view of still a further embodiment of the invention.

Fig. 4 is a similar view of still a further embodiment of the invention.

Fig. 5 is a central sectional view of the end of the leg with the adjacent portion of the socket and caster associated therewith, and illustrating a modified form of lower bearing structure.

Fig. 6 is a similar view of a further modified form of the bearing structure.

Fig. 7 is a similar view of a still further modified form of the bearing structure.

In the drawing 10 indicates a tubular leg having the cylindrical chamber 11 therein. Herein said leg is of circular cross section and the inner wall 11 is of cylindrical character. The numeral 12 indicates a conventional yoke, 13 indicates a top member rigidly secured to an elongated, central member 14 which rises therefrom. The yoke and central member are suitably connected together. Preferably such a connection is of rotational and anti-friction character, permitting relative free rotation of the horn and associated parts about the axis of the central member. Other forms of caster, however, may be utilized, such as illustrated in my prior Patents No. 1,879,429 dated September 27, 1932 and No. 1,927,271 dated September 19, 1933, or any other equivalent structure.

The central member at its upper end is threaded as indicated at 15. Therebeneath and in spaced relation there projects laterally from the central member a flange portion 16 having a tool engageable periphery. Herein the same is of hexagonal nut character. Threadedly mounted on the upper end of the central member is a nut 17 herein shown having a cylindrical periphery 18 but the same need not be of said specific character.

Bearing on the flange portion 16 and projecting laterally therebeyond is a washer 19 and the same may underlie and preferably does underlie and contact the lower end 20 of the tubular leg 10.

A cylindrical rubber sleeve member 21 is loosely slidable on the central member 14 and its lower end operatively bears on the washer 19, and its upper end is adapted to be operatively contacted by the nut structure 17. The several parts of the caster structure including the sleeve means, after the nut 17 has been threaded upon the threaded portion 15 sufficient to expand the sleeve means approximately to the interior diameter of the leg, are inserted into the leg until the lower end thereof is engaged by the washer 19. Then a wrench is applied to the periphery of the nut type flange 16 and such rotation initially causes the sleeve means to expand at the top and bottom thereof so that it immediately engages or contacts the inside of the tube. This prevents the socket or sleeve and the nut from turning, and the relative rotational or threading movement is continued until the desired mounting condition is obtained.

All of the aforesaid, except the sleeve expansion action, is substantially disclosed in the before mentioned patents and no claim basically is made to any thereof except the sleeve expansion. The invention, however, may be briefly defined as follows:

In Fig. 1 the sleeve means is provided with a biased slit designated by the numeral 22 and it herein is shown starting at the upper end of the sleeve means at the point 23, continuing to approximately the point 24 at right angles thereto, thence to the point 25 opposite the point 23 and substantially midway between the ends of the sleeve, thence to the point 26 midway between points 23 and 25, although below both, and thence to the point 27 at the lower end of the sleeve, points 23 and 27 being upon the same side of the sleeve but at opposite ends. This, therefore, is a spiral or helical slit which is naturally angularly directed with reference to the longitudinal axis of the sleeve and which is a complete convolution. When the nut 17 is threaded down upon the central member 14, there is a relatively quick expansion outwardly of the tapered end portions into leg wall engagement by reason of the compression of the sleeve means between the ends. Such quick expansion occurs at both the top and bottom of the rubber sleeve means or socket and this is because of the spiral, angular slit or cutting. This quick frictional contact causes the nut to cease rotating, as previously set forth.

There, therefore, results intimate contact of the sleeve with the inside of the tube or tubular leg which keeps the sleeve means or socket and the nut from turning upon further rotational movement of portion 16 which causes further threading movement between the nut 17 and the threaded portion 15. Further rotation secures additional compression and mechanical expansion of the sleeve means due to the sliding of the adjacent convolution surfaces of the sleeve means at the slit portion, upon each other until the entire surface of the opening between the central member 14 and the tubular leg 10 is contacted and no further mechanical expansion can occur.

Further rotation of the member 16 causes further threading action, as before mentioned, and this results in compression only and such compression is in the sleeve means and results in expansion in all directions so as to completely fill out all the space available between the central member and the interior of the tubular leg and such last mentioned compression and resulting expansion produces the necessary pressure for holding the caster in the tubular leg.

There thus results in the expansion of this split sleeve structure a rapid expansion initially so that there is an initial intimate contact rapidly effected between the sleeve means and the interior of the tubular leg. Intermediate compression action as indicated hereinbefore serves to slip one portion of the sleeve means upon the other slit portion while the final compression and resulting expansion insures complete filling of the total volume available between the washer 19 and the nut 17 and between the central member 14 and the interior 11 of the tubular leg 10. Thus, a substantially voidless tubular socket construction finally is obtained which intimately contacts interiorly the entire cylindrical member 14, as shown, and the entire interior tubular surface of the tube immediately adjacent the sleeve means.

This invention also permits the utilization of tubular, extruded material, the central bore of which is preferably circular in cross section and the exterior of which is that substantially conforming to the outline of the interior of the tubular leg to which the socket is to be applied. The exteriors and size of this sleeve may be that desired or required and no special fabrication is required following the chopping off to lengths other than cutting the kerf or slit 22 therein. If desired, this slit 22 may be cut in a relatively long length of the material and then the material cut or chopped to the desired tubular length.

In Fig. 2 of the drawing, there is illustrated a modified form of the invention and in this form there is to be found a plurality of, preferably equally spaced, annularly directed slits which start at each end of the tube and extend toward the central or intermediate portion thereof but do not intersect. Herein the projected length of these slits is shown about one-third of the length of the sleeve or socket. They may, however, be greater and they may be so arranged that they overlap, as it were, in the central portion but as stated, they do not intersect. Numerals of the one hundred series similar to those of the primary series employed in Fig. 1, designate the same or equivalent parts of the sleeve means in this embodiment of the invention.

In Fig. 3 there is illustrated a sleeve construction and the parts are designated by numerals of the two hundred series and herein the annular slit portion is of dual character and parallelly arranged, but one slit starts from one end and the other from the other end, and after passing beyond the midportion toward the opposite end, the slit is turned back and terminates in the vicinity of the midportion of the sleeve means.

In Fig. 4 there is illustrated still a further modified form of the invention and numerals of the three hundred series similar to the primary numerals, indicate like or similar parts. Herein there is illustrated two sets of angularly directed slits at each end of the sleeve means and these are diametrically positioned with respect to each other at the same end and are transversely positioned with respect to the slits at the opposite end of the sleeve means. Each slit construction starts at the end of the sleeve and extends angularly toward the midportion and the two adjacent slits of a set are divergingly directed from the end of the sleeve means.

In all instances the slits extend from the exterior cylindrical surface of the sleeve means to the bore therein and such slitting may be truly radial or biased relative thereto as desired.

In Fig. 5, 410 indicates a tubular leg having the end 420 bearing upon washer 419. Interposed between sleeve portion 21, 121, 221 or 321 and washer 419 is a leg receivable washer 430.

In Fig. 6 the locating arrangement and strain localizing element is illustrated as a plate 519 having the upwardly directed tube interior conforming portion 530 formed therein. Thus initial pressure upon member 521 insures initial movement of member 521 outwardly into engagement with the interior of the tubular leg immediately adjacent plate 519, for the purpose described.

In Fig. 7 parts are similarly indicated by numerals of the six hundred series. Herein portion 630 and plate 619 are integral, the former being slightly tapered for facilitating leg nesting. Herein, also the detail structure of one form of the caster, such as shown in elevation in Fig. 1 is illustrated.

In the three forms of lower bearing structure illustrated in Figs. 5 to 7, inclusive, it is to be understood the same takes part of the shock at the base of the unit, since it has been determined the shock at the base is greater than at the top of the unit.

While the invention has been illustrated and described in great detail in the drawing and foregoing description, the same is to be considered as illustrative and not restrictive in character.

The several modifications described herein as well as others which will readily suggest themselves to persons skilled in this art, all are considered to be within the broad scope of the invention, if the same fall within the scope of the appended claims.

The invention claimed is:

1. An anchoring structure suitable for anchoring a caster to a tubular leg, including in combination with a central elongated member having one end threaded and a laterally directed flange at the opposite end, and nut means having threaded connection with the threaded end, of rubber-like sleeve means operatively bearing at one end upon the flange and having operative engagement at its opposite end with the nut means, the sleeve means having a bore therethrough for member reception and slit from the bore to the exterior of the sleeve means and from one end thereof towards the opposite end, and biased longitudinally to provide opposed faces successively offset angularly and progressively, whereby upon axial compression of the sleeve means the opposed faces will slip one upon the other for the purpose described.

2. An anchoring structure suitable for anchoring a caster to a tubular leg, including in combination with a central elongated member having one end threaded and a laterally directed flange at the opposite end, and nut means having threaded connection with the threaded end, of rubber-like sleeve means operatively bearing at one end upon the flange and having operative engagement at its opposite end with the nut means, the sleeve means having a bore therethrough for member reception and slit from the bore to the exterior of the sleeve means and from one end thereof towards the opposite end, and biased longitudinally to provide opposed faces successively offset angularly and progressively, whereby upon axial compression of the sleeve means the opposed faces will slip one upon the other for the purpose described, the slit extending from one end to the other end of the sleeve means.

3. An anchoring structure suitable for anchoring a caster to a tubular leg, including in combination with a central elongated member having one end threaded and a laterally directed flange at the opposite end, and nut means having threaded connection with the threaded end, of rubber-like sleeve means operatively bearing at one end upon the flange and having operative engagement at its opposite end with the nut means, the sleeve means having a bore therethrough for member reception and slit from the bore to the exterior of the sleeve means and from one end thereof towards the opposite end, and biased longitudinally to provide opposed faces successively offset angularly and progressively, whereby upon axial compression of the sleeve means the opposed faces will slip one upon the other for the purpose described, the slit extending from one end to the other end of the sleeve means, and having one end of the slit at one side of the sleeve means and the other end of the slit at the same side of the sleeve means and at the other end thereof.

4. In a caster anchoring structure for tubular leg, the combination with a central member receivable by the tubularity thereof, and means associated therewith normally in spaced relation, parts thereof having relative rotational movement for moving the same toward and away from each other, of a coiled rubber spring structure, the inside diameter of the coil being approximately that of the exterior diameter of the central member and the exterior diameter of the coil being approximately that of the interior diameter of the leg and compressible for convolution contact and leg and central member engagement for substantially filling the annular space between the central member and the tubular leg.

5. In a caster anchoring structure for tubular leg, the combination with a central member receivable by the tubularity thereof, and means associated therewith normally in spaced relation, parts thereof having relative rotational movement for moving the same toward and away from each other, of a one-piece rubber spring structure slit in biasing relation to the longitudinal axis thereof and substantially filling the annular space between the central member and the inside wall of the leg, movement of the parts of said means toward each other causing relative movement of said rubber spring on the opposed faces of the slit by slippage therebetween and movement of other portions of said rubber spring relative to each other, these movements circumferentially enlarging the entire spring structure circumferentially and reducing the length thereof for substantially filling the annular space before mentioned for holding the central member in the tubular leg.

WILLIAM H. NOELTING.